UNITED STATES PATENT OFFICE.

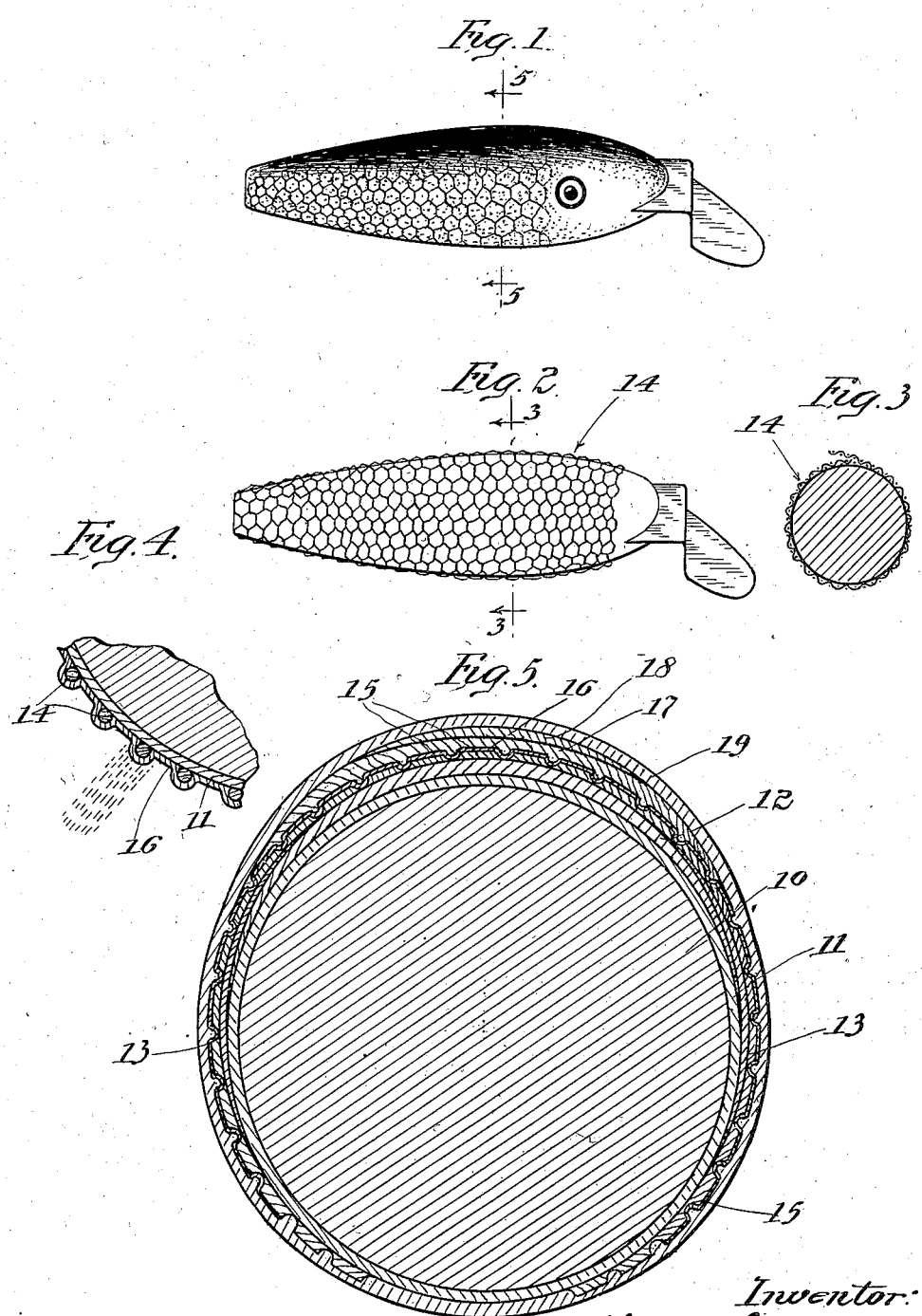

HENRY S. DILLS, OF GARRETT, INDIANA, ASSIGNOR OF ONE-HALF TO JAMES HEDDON'S SONS, INCORPORATED, OF DOWAGIAC, MICHIGAN, A CORPORATION OF MICHIGAN.

ARTIFICIAL BAIT OR LURE.

1,323,458.  Specification of Letters Patent.  Patented Dec. 2, 1919.

Original application filed January 25, 1918, Serial No. 213,628. Divided and this application filed July 1, 1918. Serial No. 242,701.

*To all whom it may concern:*

Be it known that I, HENRY S. DILLS, a citizen of the United States, residing at Garrett, in the county of Dekalb and State of Indiana, have invented new and useful Improvements in Artificial Baits or Lures, of which the following is a full, clear, concise, and exact description, reference being had to the accompanying drawing, forming a part of this specification.

My invention relates to artificial baits or lures.

Among the objects of my invention is the provision of an artificial bait which will be attractive in appearance and which will be easy to manufacture. More specifically, one object of my invention is the provision of an artificial bait or lure having on its surface an imitation of the scales of a natural minnow.

In order to give a general idea of my invention, it is here stated that the particular embodiment of my invention disclosed in this application comprises a cigar-shaped wooden body, to which various coatings of coloring material are applied. The body is provided with a coating forming a background of non-lustrous coloring material; a flexible cloth netting is then wrapped closely around this body, and a coating of lustrous coloring material is sprayed onto the body through the netting. The netting is then removed, leaving an interrupted coating of lustrous coloring material overlying the background of non-lustrous coloring material, the non-lustrous coloring material being visible through the interruptions of the outer coating in the form of a network. Other coatings of coloring material may then be applied to various parts of the body of the bait over the coating of lustrous coloring material, to form any desired color scheme, and a coating of transparent lustrous lacquer may then be applied over the entire surface of the bait.

In the drawings, in which one embodiment of my invention is shown—

Figure 1 is a perspective view showing an artificial bait or lure provided with my improved scale finish;

Fig. 2 is a perspective view of the bait in process of manufacture, showing the flexible netting wrapped around it;

Fig. 3 is a section on the line 3—3 of Fig. 2;

Fig. 4 is an enlarged fragmentary transverse sectional view showing the netting in position on the body and the lustrous coloring material being sprayed thereon; and Fig. 5 is an enlarged transverse sectional view on the line 5—5 of Fig. 1, showing the different coatings of coloring material, these coatings being somewhat exaggerated in order to show them to better advantage.

Referring now to the drawings in detail, the exemplification of my invention shown comprises a cigar-shaped wooden body 10 to which the various coatings of coloring material are applied. The first coat 11 may be white and may cover the entire surface of the bait. A network of this white coating at the under side of the bait remains visible on the finished bait and gives it a light-colored effect in the lower portion thereof, which is desirable. A coating 12 of dark green may then be applied to the upper half of the bait by means of an air-brush, or in any suitable manner. A network of this green coating remains visible at the sides in the finished bait. A thin coating 13 of bronze or gold-colored material may be applied to the sides of the bait.

The previously-described coatings form a background over which an interrupted coating of lustrous material is applied. Other colors and arrangements of coatings may be used for the background if desired.

In applying the interrupted coating, a flexible openwork fabric or netting 14, which may be cloth screening or mosquito netting, is wrapped snugly about the bait and a coating 15 of lustrous silver-colored material applied through the netting 14 by means of an air-brush. The netting 14, being in intimate contact with the previously-applied coating of coloring material, prevents the coating of lustrous material from reaching those portions of the bait covered by the strands of the netting, so that when the netting is removed it leaves an interrupted coating of lustrous material, through the interruptions of which the previously applied coatings are visible as networks, the interrupted coating itself being divided by the interruptions into a multiplicity of polygonal figures, these interruptions forming a network of uniformly defined lines representing the outlines of fish scales.

After the flexible netting has been removed, various other coatings may be applied over the interrupted lustrous coating to give the desired finish.

In the particular embodiment shown, a thin coating 16 of green coloring material is applied to the upper and side portions of the bait, this coating being applied so thinly, however, that the lustrous coloring material, while somewhat obscured, is visible beneath it. A thick coating 17 of green may then be applied to the top of the bait in an amount sufficient to practically hide the lustrous silver coating. A narrow strip 18 of silver-colored material may then be applied at the very top of the bait and from one end to the other. The entire bait is then covered with a transparent lustrous lacquer 19, which adds to the scale finish effect of the previously-applied coatings, the previously-applied coatings being visible through this transparent shiny lacquer, and the combination of the underlying coatings with the overlying lacquer giving a decidedly scale-finish effect.

Various colors and arrangements of colors, and various shapes of baits, may be used without departing from the spirit of my invention, the scope of which is defined in the appended claims.

After the various color coatings have been applied, the bait may be equipped with the usual hooks and line-fastenings and other fittings which go to make up an artificial bait or lure.

This application is a continuation, as far as concerns common subject-matter claimed herein, of my copending application Serial No. 213,628, filed January 25, 1918, in which claims are presented for a process that may be used in the manufacture of an artificial bait of the type set forth in this present application.

I claim as new and desire to secure by Letters Patent of the United States:

1. A fish bait having a light-colored coating of non-lustrous material on its lower portion; a second dark-colored coating of non-lustrous material on its upper portion; a third coating of lustrous coloring material overlying both said first and second coatings and forming an interrupted layer, the interruptions of which form a network dividing said third coating into a multiplicity of polygonal figures through which said first and second coatings are visible as different colored networks; a fourth coating of dark-colored material on the top of the bait; and a fifth coating of transparent lustrous material overlying said first, second, third, and fourth coatings.

2. A fish bait having a first coating of light-colored non-lustrous material on its lower portion; a second coating of dark-colored non-lustrous material on the upper portion of said bait; a third coating of lustrous coloring material overlying both said first and second coatings, and forming an interrupted layer, through the interruptions of which both said first and second coatings are visible as different colored networks, said interruptions forming a network dividing said third coating into a multiplicity of polygonal figures; and a fourth coating of transparent lustrous material overlying said first, second, and third coatings.

3. A fish-bait having a first coating of light-colored non-lustrous material on its lower portion; a second coating of dark-colored non-lustrous material on its upper portion; a third coating of lustrous material overlying both said first and second coatings and forming an interrupted layer, the interruptions of which form a network dividing said third coating into a multiplicity of polygonal figures, between which figures said first and second coatings are visible as different colored networks; and a fourth coating of dark-colored material on top of the bait.

4. A fish bait having a first coating of light-colored non-lustrous material on the lower portion; a second coating of dark-colored non-lustrous material on its upper portion; and a third coating of lustrous coloring material overlying both said first and second coatings and forming an interrupted layer, the interruptions of which form a network dividing said third coating into a multiplicity of polygonal figures, between which figures said first and second coatings are visible as different colored networks.

5. A fish bait having a first coating of non-lustrous coloring material; a second coating of lustrous coloring material overlying said first coating and forming an interrupted layer, the interruptions of which form a network dividing said second coating into a multiplicity of polygonal figures, said first coating being visible through said interruptions as a network; and a third coating of transparent material overlying said second coating.

6. A fish bait having a first coating of non-lustrous coloring material; and a second coating of lustrous coloring material overlying said first coating and forming an interrupted layer, the interruptions of which form a network dividing said second coating into a multiplicity of polygonal figures, said first coating being visible as a network through the interruptions of said second coating.

7. A fish bait having a first coating of coloring material forming a layer; and a second coating overlying said first coating and forming an interrupted layer, said interruptions forming a network dividing said second coating into a multiplicity of polygonal figures, said first coating being visible as a network through the interruptions of said second coating.

8. A fish bait having a first coating of non-lustrous material; and a second coating of silvery material overlying said first coating and forming an interrupted layer, through the interruptions of which said first coating is visible as a network, said interruptions forming a network dividing said second coating into a multiplicity of polygonal figures.

9. A fish bait having a first coating of coloring material forming a layer; and a second coating overlying said first coating and forming an interrupted layer, through the interruptions of which said first coating is visible as a network of uniformly-defined lines representing the outlines of fish scales.

10. A fish bait having a first coating of non-lustrous coloring material, a second coating of lustrous coloring material overlying said first coating and forming an interrupted layer, through the interruptions of which said first coating is visible as a network of uniformly-defined lines representing the outline of fish-scales.

In witness whereof, I have hereunto subscribed my name.

HENRY S. DILLS.

Witnesses:
  J. D. BRINKHOFF,
  GEORGE WARD.